Nov. 14, 1961     O. M. TOENNIES     3,008,594
UNLOADING MACHINE FOR MOLDED FOOD PRODUCTS
Filed March 2, 1959     2 Sheets-Sheet 1
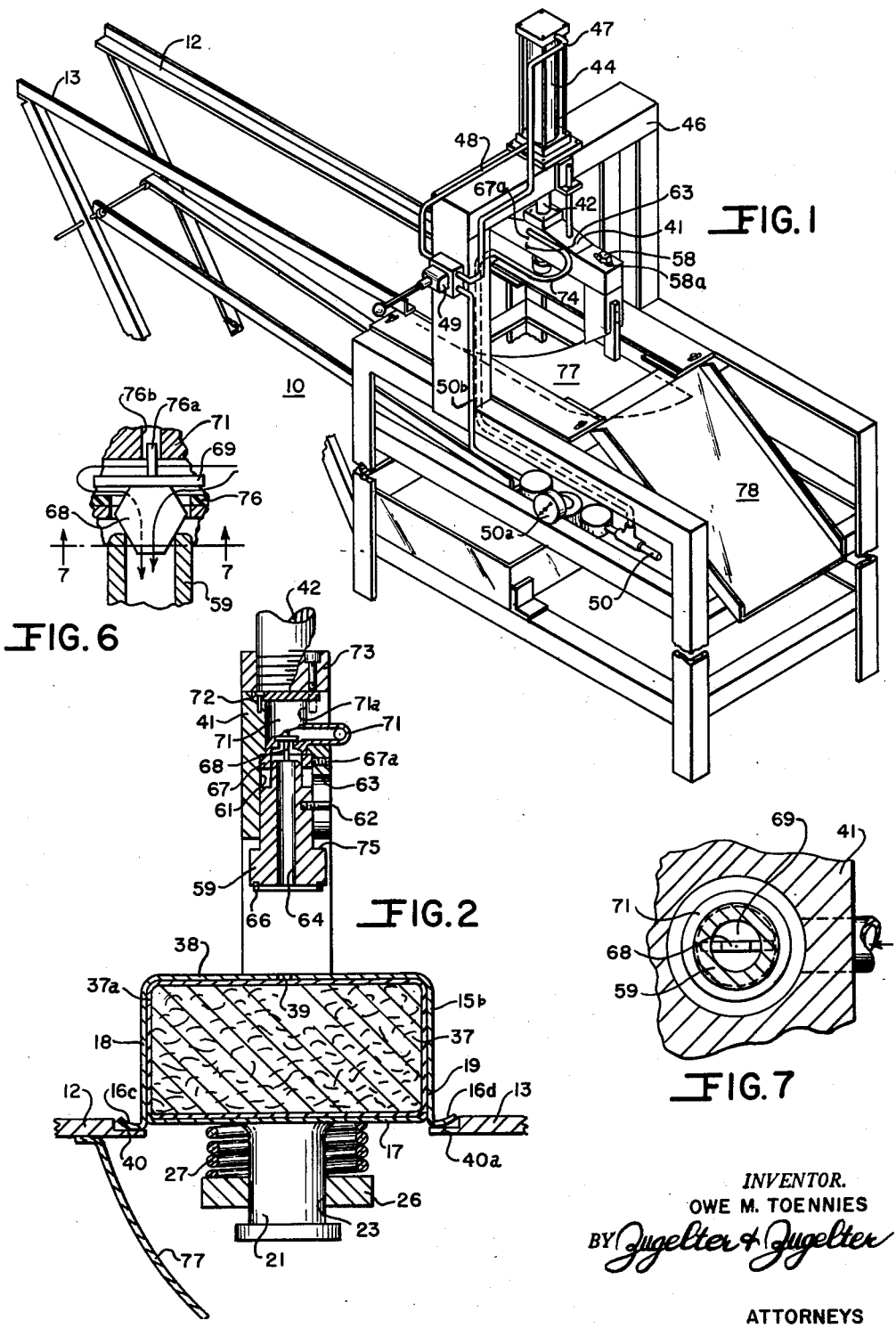
INVENTOR.
OWE M. TOENNIES
BY Jugelter & Jugelter
ATTORNEYS Nov. 14, 1961   O. M. TOENNIES   3,008,594
UNLOADING MACHINE FOR MOLDED FOOD PRODUCTS
Filed March 2, 1959   2 Sheets-Sheet 2
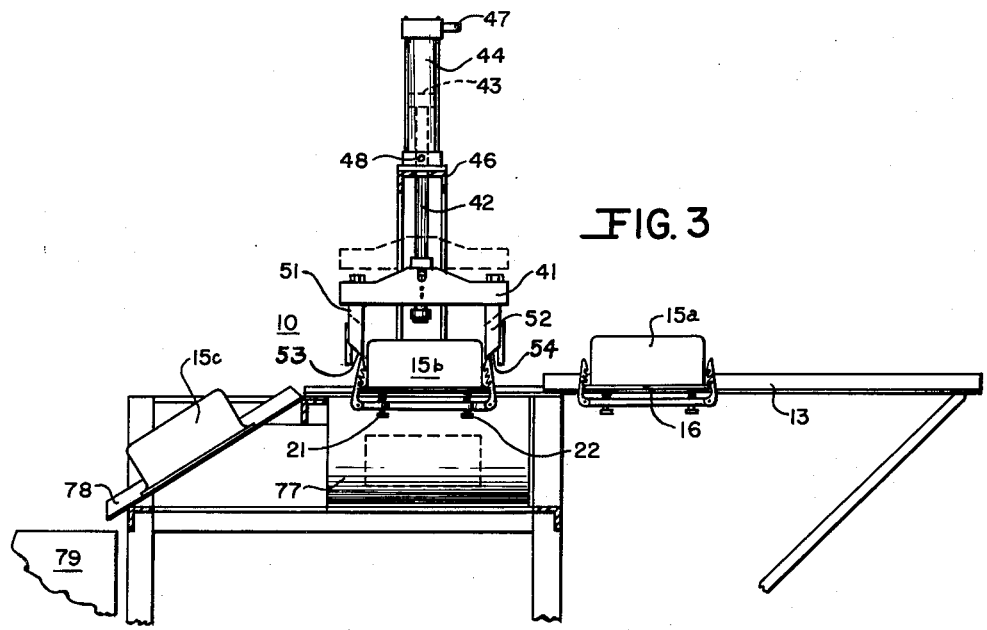
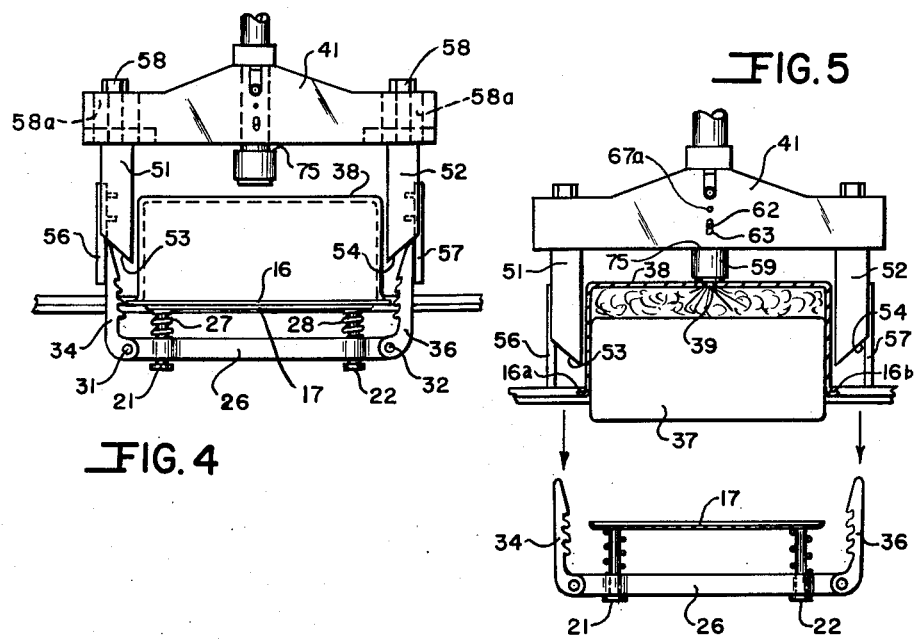
INVENTOR.
OWE M. TOENNIES
BY Jugelter & Jugelter
ATTORNEYS United States Patent Office 3,008,594
Patented Nov. 14, 1961

3,008,594
UNLOADING MACHINE FOR MOLDED
FOOD PRODUCTS
Owe M. Toennies, Cincinnati, Ohio, assignor to The Grove Research and Development Co., Cincinnati, Ohio, a corporation of Ohio
Filed Mar. 2, 1959, Ser. No. 796,687
4 Claims. (Cl. 214—304)

This invention relates to machines for processing meat proucts or the like. More particularly, this invention relates to a machine for unloading a pressed meat product or the like from a mold or container in which it is processed.

Pressed food products, and, in particular, pressed meat products, have a tendency to stick to containers in which they are processed. An object of this invention is to provide a machine which quickly and readily frees a pressed food product from the container in which it is processed.

A further object of this invention is to provide a machine of this type which injects fluid under pressure between a block of pressed food product and the walls of the container in which the block is processed to quickly release the block from the container.

A further object of this invention is to provide a machine of this type which injects compressed air or the like through an opening in the bottom of a container to penetrate between the walls of the container and the block therein to release the block from the container.

The above and other objects and features of the invention will be apparent to those skilled in the art to which this invention pertains from the following detailed description and the drawings, in which:

FIG. 1 is a perspective view showing a mold unloading machine constructed in accordance with an embodiment of this invention;

FIG. 2 is an enlarged view in transverse section partly broken away showing a head portion of the machine and tracks thereof in relation to a container supported on the tracks;

FIG. 3 is a somewhat schematic view partly in side elevation and partly in lengthwise section, showing the machine with containers thereon, the head portion being shown in dot-dash lines in raised position and in a partly lowered position in full lines;

FIG. 4 is an enlarged, fragmentary view showing the head portion of the machine in another partly lowered position;

FIG. 5 is a view like FIG. 4 showing the head in fully lowered position;

FIG. 6 is an enlarged view in transverse section of the interior of the head portion; and FIG. 7 is a view in section, taken on the line 7—7 of FIG. 6.

In the following detailed description, and the drawings, like reference characters indicate like parts.

In FIGS. 1 and 3 is shown a machine 10 constructed in accordance with an embodiment of this invention. The machine includes spaced tracks 12 and 13 which, as shown in FIG. 3, are adapted to support meat containers or molds 15a, 15b, 15c. As shown in FIGS. 3 and 4, each meat container is a hollow, substantially rectangular box having an open side provided with an outwardly extending peripheral flange 16 which is supported in inverted relation upon the tracks. The open side of the container can be closed by a cover assembly which includes a cover plate 17 which fits between walls 18 and 19 of the container. The cover 17 is mounted on pins 21 and 22 (FIGS. 3–5) which extend through openings 23, only one of which is shown (FIG. 2) in a yoke plate 26. Compression springs 27 and 28 (FIG. 4) are mounted on the pins between the yoke plate 26 and the cover 17, as shown in FIG. 2. Ends of the yoke plate support pivot pins 31 and 32 (FIG. 4) on which flanged catches or hooks 34 and 36 are pivotally mounted respectively. Each container is adapted to receive a block of pressed meat 37 (FIGS. 2 and 5), or the like, which may be wrapped in a wrapper of parchment paper, or the like, 37a. The bottom 38 of the container is provided with a small opening 39 for purposes to be explained hereinafter. Flanges of the catches engage end portions 16a and 16b of the peripheral flange 16 to hold the cover assembly in position with the cover plate 17 closing the open side of the container.

The container rides in inverted position along tracks 12 and 13 with side portions 16c and 16d of the peripheral flange riding on shoulders 40 and 40a of the tracks as shown in FIG. 2, and can be advanced to a position below a head 41 in which the container 15b is shown in FIGS. 2 and 3.

The head 41 is mounted on a piston rod 42 (FIGS. 1 and 3). A piston 43 (FIG. 3), mounted upon the piston rod 42, reciprocates inside a cylinder 44 which is mounted on an inverted U-shaped frame 46 overlying the track. Compressed air can be led into the upper and lower ends of the cylinder 44 through lines 47 and 48, respectively. A manually operated valve 49 controls the flow of compressed air to the cylinder. The air reaches the valve 49 from a supply line 50 (FIG. 4) through appropriate metering devices 50a and a lead 50b. When air is directed into the lower end of the cylinder 44, the head is raised to the dot-dash line position of FIG. 3. When air is directed into the upper end of cylinder 44 through the line 47, the head moves downwardly.

The head carries wedge blocks 51 and 52 having inclined or wedging faces 53 and 54 (FIGS. 3 and 4), respectively, which engage the free ends of catches 34 and 36, respectively, as indicated in full lines in FIG. 3 and in FIG. 4 to swing the catches outwardly to release the end portion flanges of the container. As the head is lowered further, the catches 34 and 36 engage stop blocks 56 and 57, respectively, as shown in FIG. 4 which limit outward swinging of the catches so that each catch is caught between one of the wedge blocks and one of the stop blocks. Then, as the head moves further downwardly the cover assembly is driven from the container and falls downwardly as shown in FIG. 5. As shown in FIG. 4, each wedge block is mounted on a bolt 58 which extends through an upright slot 58a in the head 41, and the positions of the wedge blocks can be adjusted by loosening the bolts 58.

The head also carries an air fitting 59 (see FIG. 2). The head has an upright bore 61 therein in which the fitting 59 is received. A pin 62 mounted on the fitting 59 extends through an upright slot 63 to limit up and down movement of fitting 59. The fitting has a lengthwise bore 64. A sealing ring 66 of rubber-like material is attached to the lower end of the fitting surrounding the lower end of the bore 64.

The upper end of the fitting 59 reciprocates inside a ring 67, which is held in place in the bore 61 by a set screw 67a. The upper end of the fitting 59 is engageable with a stem 68 of air valve 69, as shown most clearly in FIG. 6. The valve 69 includes a body 71 which is received in an upper portion 71a of the bore in the head, the upper portion of the bar being of reduced diameter. The body 71 is held in place in the bore portion 71a by the ring 67 and a plate 72 which is attached to the head overlying the bore. A block 73 is attached to the head 41 overlying the plate 72. The block 73 has a bore in which the lower end of the piston rod 42 is received.

When the head is lowered to the FIG. 5 position, the sealing ring 66 engages the bottom 38 of the container surrounding the opening 39. The valve stem engages the upper end of the fitting and the valve is unseated to permit air under pressure to flow through the air fitting 59 and through the opening 39 in the bottom of the container. The air under pressure reaches the air fitting 59 from the supply line 50 through an air inlet line 74 (see FIG. 2). When the valve is unseated, air flows through the bore of the air fitting 59, and, as shown in FIG. 5, through the opening 39 in the bottom of the container to force the block of meat 37 from the container. As shown in FIG. 5, a shoulder 75 on the air fitting 59 engages the bottom of the head 41 to limit relative movement thereof. When the valve stem is released, air pressure inside the cavity of the valve body forces the disc of the valve against a ring gasket 76 (FIG. 6) to close the valve. A pin 76a reciprocating in a bore 76b in the body guides the valve disc.

As shown in FIGS. 1 and 2, the machine is provided with a curved guide 77 which underlies the head and catches first the cover assembly and then the block of meat as they fall downwardly between the tracks. An appropriate chute or table (not shown) may be provided to receive the cover assembly and the block of meat as they fall from the guide 77.

When the block of pressed meat has been removed, the head can again be raised to the dot-dash line position of FIG. 3, and another container can be moved into position for unloading. At the same time the empty container is advanced onto a sloping chute 78 and falls downwardly into an appropriate receptacle 79 (only a portion of which is shown in FIG. 3).

The machine illustrated in the drawings and described above is subject to structural modification without departing from the spirit and scope of the appended claims.

Having described my invention, what I claim as new and desire to secure by Letters Patent is:

1. A machine for unloading a container having an open side, a bottom opposite the open side provided with a perforation and outwardly extending flanges at opposite ends of the container, and a removable cover assembly including a cover plate which closes the open side of the container, a main frame carrying the cover plate, and hooks on the opposite ends of the main frame for releasably engaging the end flanges, said unloading machine comprising spaced means for supporting opposite side edges of the container in inverted position, a head movable between a raised position and a lowered position, wedge blocks mounted on the head for engaging the hooks to release the hooks, stop blocks mounted on the wedge blocks, engageable by the hooks when free from the flanges to limit movement of the hooks in freeing direction, whereby additional downward movement of the head forces the cover assembly downwardly away from the container, an air fitting mounted in the head and engageable with the bottom of the container at the opening, and means for injecting air under pressure through said air fitting and through the opening in the bottom of the container when the fitting engages the bottom of the container to force the contents of the container therefrom.

2. A cover opening device for a machine for unloading a container having an open side, and outwardly extending flanges at opposite ends of the container, and a removable cover assembly including a cover plate which closes the open side of the container, a main frame carrying the cover plate, and hooks on the opposite ends of the main frame for releasably engaging the end flanges, said cover opening device comprising spaced means for supporting opposite side edges of the container in inverted position, a head movable between a raised position and a lowered position, wedge blocks mounted on the head for engaging the hooks to release the hooks, and stop blocks mounted on the wedge blocks, engageable by the hooks when free from the flanges to limit movement of the hooks in freeing direction, whereby additional downward movement of the head forces the cover assembly downwardly away from the container to open the container.

3. A cover opening device for a machine for unloading a container having an open side and outwardly extending flanges at opposite ends of the container, and a removable cover assembly including a cover plate for closing the open side of the container, a main frame carrying the cover plate, and hooks pivotally mounted on opposite ends of the main frame for releasably engaging the end flanges, said cover opening device comprising spaced tracks for supporting opposite side edges of the container in inverted position, a head movable toward and away from the track, wedge blocks mounted on the head for engaging the hooks to release the hooks when the head is moved toward the track, and stop blocks mounted on the wedge blocks and engageable by the hooks when free from the flanges to limit movement of the hooks in freeing direction, whereby each hook is wedged between one of the wedge blocks and the stop block associated therewith and additional downward movement of the head forces the cover assembly downwardly away from the container to remove the cover assembly.

4. A machine for removing a cover assembly and unloading a hollow container having an open side and removable cover assembly including a cover plate which closes the open side of the container, a main frame carrying the cover plate, and hooks for linking ends of the main frame to ends of the container, said container having a wall provided with an opening therein remote from the open side, said machine comprising a track for supporting edges of said container adjacent said open side, a head member movable toward and away from said track, means on the head member engageable with the hooks when the head member is moved toward the track to release the hooks, a fluid pressure fitting slidably mounted on said head for sliding in a direction parallel to movement of the head, there being a bore in said fluid pressure fitting, a resilient sealing ring mounted on the fluid pressure fitting surrounding the bore and engageable with said wall surrounding the opening therein, a fluid valve mounted in the head in communication with the bore of the fluid pressure fitting, means for supplying fluid under pressure to the valve, and a valve actuator engageable by the fluid pressure fitting when the head is moved toward the container while the sealing ring of the fluid pressure fitting engages said wall to open the valve, whereby the fluid enters the container through the opening therein to discharge a load from the container.

References Cited in the file of this patent

UNITED STATES PATENTS

| | | |
|---|---|---|
| 1,664,667 | Davis | Apr. 3, 1928 |
| 2,795,344 | Lubischer | June 11, 1957 |